(12) United States Patent
Onoda et al.

(10) Patent No.: US 8,125,535 B2
(45) Date of Patent: Feb. 28, 2012

(54) IMAGING APPARATUS, CONTINUOUS SHOOTING CONTROL METHOD, AND PROGRAM THEREFOR

(75) Inventors: Takashi Onoda, Tokyo (JP); Akira Miyata, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 740 days.

(21) Appl. No.: 12/136,947

(22) Filed: Jun. 11, 2008

(65) Prior Publication Data

US 2008/0309793 A1    Dec. 18, 2008

(30) Foreign Application Priority Data

Jun. 12, 2007    (JP) .................................. 2007-154911

(51) Int. Cl.
*H04N 5/235* (2006.01)
*G03B 7/00* (2006.01)

(52) U.S. Cl. ...................... 348/229.1; 348/362
(58) Field of Classification Search .............. 348/220.1, 348/362, 364, 367, 222.1, 229.1, 221.1
See application file for complete search history.

(56) References Cited

U.S. PATENT DOCUMENTS

| | | | |
|---|---|---|---|
| 6,407,772 B2 * | 6/2002 | Mizoguchi | 348/220.1 |
| 7,012,638 B1 * | 3/2006 | Yokonuma | |
| 7,483,064 B2 | 1/2009 | Hattori | |
| 7,545,434 B2 * | 6/2009 | Bean et al. | 348/362 |
| 7,868,920 B2 | 1/2011 | Leem | |
| 8,041,207 B2 * | 10/2011 | Sasaki et al. | 396/265 |
| 2003/0095192 A1 * | 5/2003 | Horiuchi | 348/222.1 |
| 2006/0164533 A1 | 7/2006 | Hsieh et al. | |
| 2008/0309776 A1 * | 12/2008 | Suzuki | 348/220.1 |

FOREIGN PATENT DOCUMENTS

| | | | |
|---|---|---|---|
| EP | 1 768 389 A2 | | 3/2007 |
| JP | 63-205644 A | | 8/1988 |
| JP | 07-038785 A | | 2/1995 |
| JP | 08-205021 A | | 8/1996 |
| JP | 2001-094854 A | * | 4/2001 |
| JP | 2001-257925 A | | 9/2001 |

(Continued)

OTHER PUBLICATIONS

Japanese Office Action dated Jun. 1, 2010 and English translation thereof, issued in counterpart Japanese Application No. 2008-131625.

Korean Office Action dated Jul. 31, 2009 and English translation thereof issued in a counterpart Korean Application No. 10-2008-0054674.

(Continued)

*Primary Examiner* — David Ometz
*Assistant Examiner* — Carramah J Quiett
(74) *Attorney, Agent, or Firm* — Holtz, Holtz, Goodman & Chick, PC

(57) ABSTRACT

Herein disclosed is an imaging apparatus, carrying out a step of calculating an exposure value based on image data obtained by the imaging section, a step of computing a shutter speed by mean of, for example, a program AE control in accordance with the exposure value calculated in the calculation step; a step of determining, in accordance with the shutter speed computed in the computation step, a continuous shooting speed indicative of the number of photographs per unit time; and a step of driving the imaging section so that a photographing operation is carried out with the continuous shooting speed thus determined.

8 Claims, 11 Drawing Sheets

FOREIGN PATENT DOCUMENTS

| | | | |
|---|---|---|---|
| JP | 2002-148693 A | * | 5/2002 |
| JP | 2006-129076 A | | 5/2006 |
| JP | 2006-172021 A | | 6/2006 |
| JP | 2006-287323 A | | 10/2006 |
| KR | 1020050062463 A | | 6/2005 |
| KR | 1020050117926 A | | 12/2005 |

OTHER PUBLICATIONS

Japanese Office Action dated Aug. 31, 2010 (and English translation thereof) in counterpart Japanese Application No. 2008-131625.
Extended European Search Report (EESR) dated Dec. 15, 2010 (in English) in counterpart European Application No. 08010455.7.

* cited by examiner

FIG. 6

| TIMING OF SETTING SHOOTING SPEED | FLAG | |
|---|---|---|
| TIMING OF STARTING CONTINUOUS SHOOTING | 1 | ~ 301 |
| EACH TIMING OF A PHOTOGRAPHING | 0 | ~ 302 |
| EACH TIMING OF PLURAL PHOTOGRAPHING | 0 | ~ 303 |

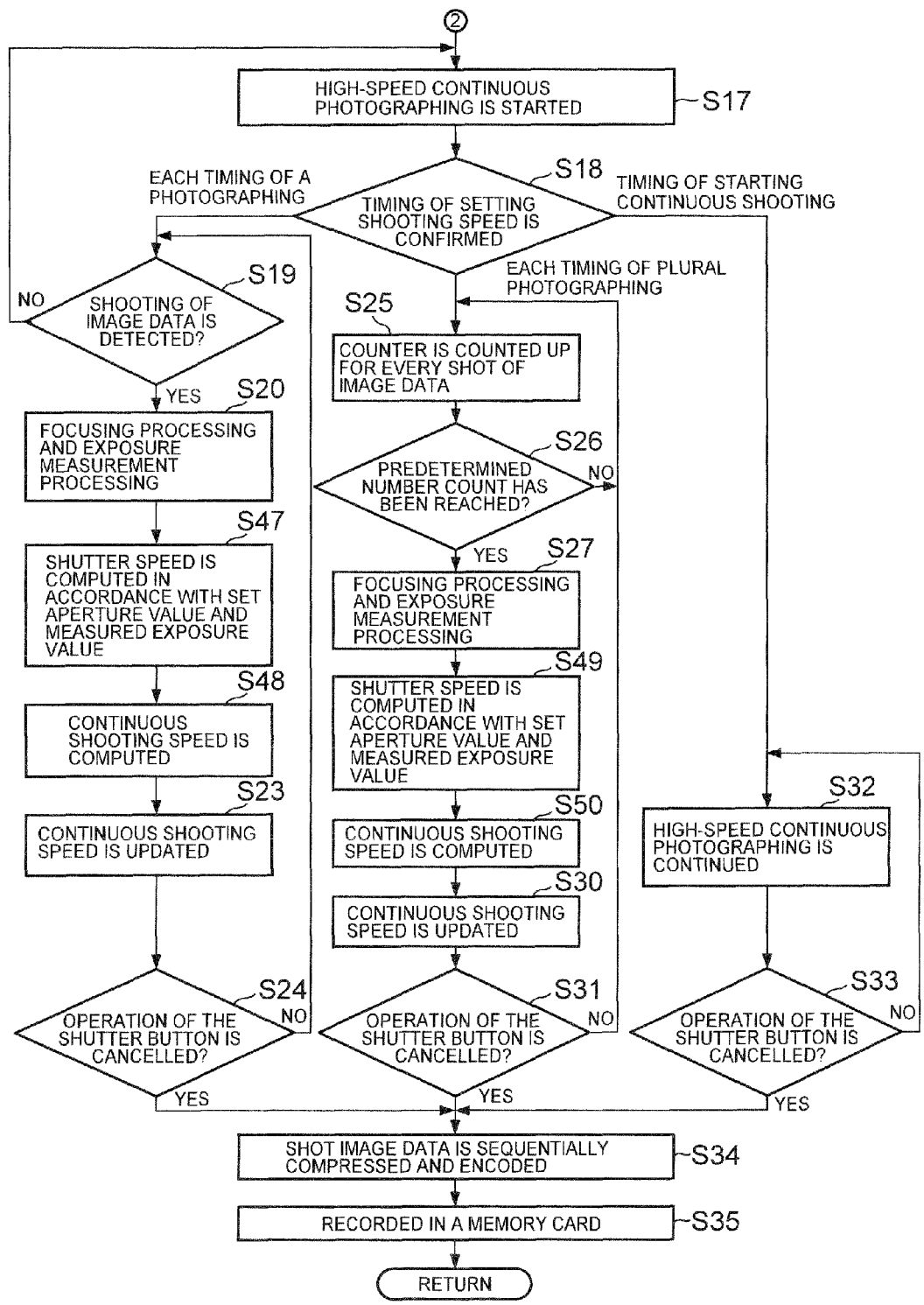

IMAGING APPARATUS, CONTINUOUS SHOOTING CONTROL METHOD, AND PROGRAM THEREFOR

This application is based on and claims the benefit of priority from Japanese Patent Application No. 2007-154911, filed on 12 Jun. 2007, the content of which is incorporated herein by reference.

BACKGROUND OF THE INVENTION

1. Field of the Invention

The present invention relates to an imaging apparatus having a continuous shooting function, a continuous shooting control method, and a program therefore.

2. Related Art

In recent years, many digital cameras have been put into practical use that use Charge Coupled Devices (CCD) to convert an optical still image captured by a lens to an electric signal to record the signal in a recording medium such as a semiconductor memory or a floppy disk.

Generally, this type of digital camera includes a continuous shooting function to carry out a plurality of photographing operations by a single shot. Conventionally, a digital camera has been provided through which an operation by a user can be used to set a plurality of different continuous shooting speeds (the number of photographing operations per unit time).

SUMMARY OF THE INVENTION

It is an objective of the present invention to easily set a continuous shooting speed by which an appropriate photographing exposure can be obtained.

In accordance with a first aspect of the present invention, there is provided an imaging apparatus, comprising: an imaging section for photographing a subject image to obtain image data; a calculation section for calculating an exposure value based on the image data obtained by the imaging section; a computation section for computing a shutter speed by mean of a program AE control in accordance with the exposure value calculated by the calculation section; a determination section for determining, in accordance with the shutter speed computed by the computation section, a continuous shooting speed indicative of the number of photographs per unit time; and a driving control section for driving the imaging section so that a photographing operation is carried out in accordance with the continuous shooting speed determined by the determination section.

In accordance with another aspect of the present invention, there is provided a continuous shooting control method, comprising: a calculation step of calculating an exposure value based on image data obtained through a photographing operation; a computation step of computing a shutter speed by mean of a program AE control in accordance with the exposure value calculated in the calculation step; a determination step of determining, in accordance with the shutter speed computed in the computation step, a continuous shooting speed indicative of the number of photographs per unit time; and a driving control step of driving the imaging section so that a photographing operation is carried out with the continuous shooting speed determined in the determination step.

In accordance with still another aspect of the present invention, there is provided a computer-readable recording medium including a program executable by a computer to carry out: a calculation processing for calculating an exposure value based on image data obtained through a photographing operation; a computation processing for computing a shutter speed by mean of a program AE control in accordance with the exposure value calculated in the calculation processing; a determination processing for determining, in accordance with the shutter speed computed in the computation. Processing, a continuous shooting speed indicative of the number of photographs per unit time; and a driving control processing for driving the imaging section so that a photographing operation is carried out with the continuous shooting speed determined in the determination Processing.

BRIEF DESCRIPTION OF THE DRAWINGS

FIG. 6 is a diagram showing a table 300 according to the present invention;

FIG. 11 is a flowchart illustrating a processing operation according to Example 2.

DETAILED DESCRIPTION OF THE INVENTION

Hereinafter, the present embodiment will be described in derail with reference to the drawings.

It is noted that many variations are possible, for example, constituent members in the present embodiment can be appropriately exchanged with existing constituent members or the like, and also can be combined with other existing constituent members.

Appearance and Configuration of Imaging Apparatus

Figure 1A:
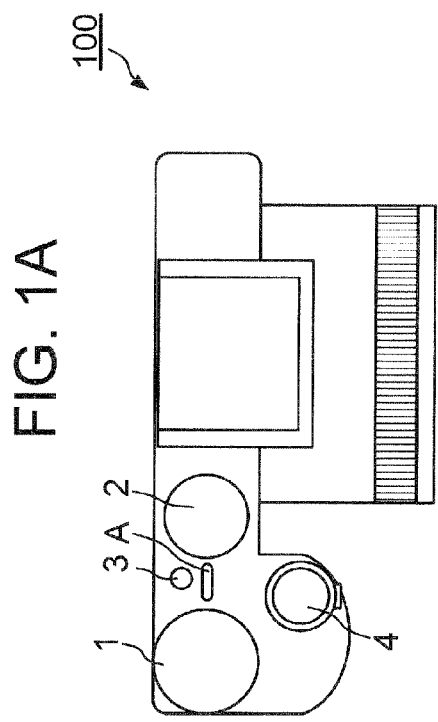
FIG. 1A is a top view illustrating an embodiment of the imaging apparatus according to the present invention.
Figure 1C:
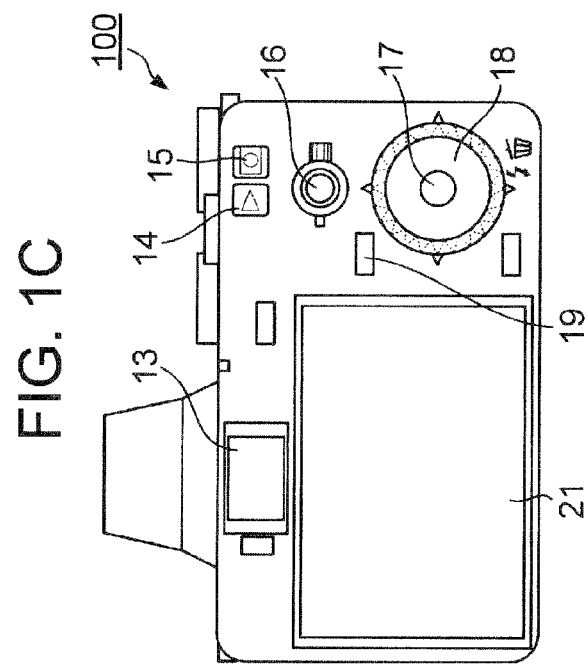
FIG. 1C is a back view illustrating an embodiment of the imaging apparatus according to the present invention.
Figure 1B:
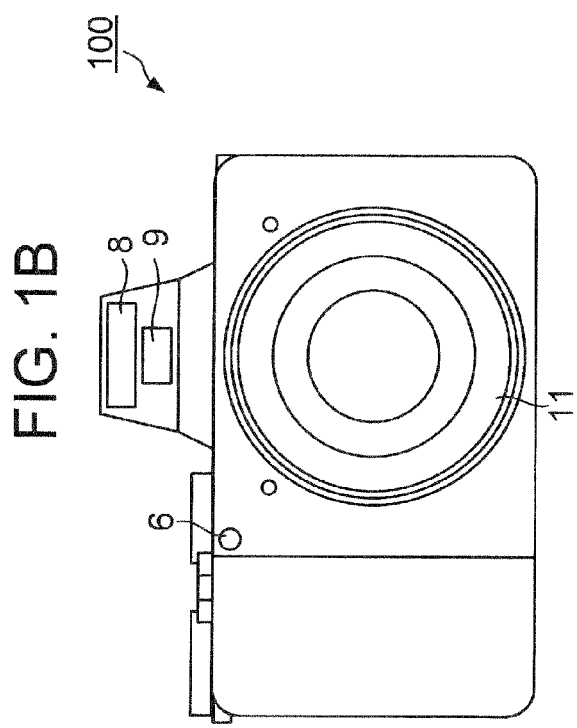
FIG. 1B is a front view illustrating an embodiment of the imaging apparatus according to the present invention.

A present embodiment of the imaging apparatus 100 has an appearance and configuration as shown in FIG. 1. FIG. 1A is a top view of the imaging apparatus 100. FIG. 1B is a front view of the imaging apparatus 100. FIG. 1C is a back view of the imaging apparatus 100.

As shown in FIG. 1A, the imaging apparatus 100 includes, at the top face thereof, a continuous shooting dial 1, a mode dial 2, a power source button 3, and a shutter button 4. The continuous shooting dial 1 and the mode dial 2 each include a rotating-type setting mechanism. The continuous shooting dial 1 is used to set various continuous shooting modes. The mode dial 2 is used to set various photographing modes. Between the continuous shooting dial 1 and the mode dial 2 is a printed mark A. By rotating the continuous shooting dial 1 and the mode dial 2 to the position of the mark A, a specific photographing mode can be set by a combination of these modes.

The front face of the imaging apparatus 100 includes, as shown in FIG. 1B, an Auto Focus (AF) auxiliary light or a self timer LED 6, a xenon flash 8, an LED flash 9, and a lens 11.

The back face of the imaging apparatus 100 includes, as shown in FIG. 1C, an Electronic View Finder (EVF) 13, a play button 14, a Rec button 15, a moving image button 16, a SET key 17, a control button 18, a MENU button 19, a DISP key 20, and an LCD 21.

The EVF 13 uses a liquid crystal screen as a camera finder. The play button 14 is a button to set a play mode. The Rec button 15 is a button to set a photographing mode.

The moving image button 16 is a rotating-type dial to set a moving image mode. The control button 18 integrates item selection keys in up, down, left, and right directions. The center of the control button 18 has the SET key 17. The SET key 17 is a key operated to set the then-selected item.

The MENU button 19 is a key to set various systems. In the play mode for example, various items including a delete mode are displayed on the CD 21. In the photographing mode, the LCD 21 displays selected items required for the recording of an image such as, for example, the definition of a recorded image, ON or OFF of auto focus, the number of photographed images of a movie image).

The DISP key 20 is a key to display various pieces of information on the image displayed on the LCD 21 in an overlapped manner. For example, in the photographing mode, information for the remaining number of images that can be photographed or a photographing format for example is displayed in an overlapped manner. In the play mode, attribute information of a reproduced image (e.g., page number, definition) is displayed in an overlapped manner. The LCD 21 is composed of a backlit color liquid crystal panel. The LCD 21 in the photographing mode displays a through-the-lens image on a monitor. The LCD 21 in the play mode plays and displays a selected image for example.

A side face (not shown) of the imaging apparatus 100 has a connection section of a USB terminal used to connect an external apparatus such as a personal computer, a modem, or the like via a Universal Serial Bus (USB) and a slot for example to which a memory card or the like is inserted.

Electrical Configuration of Imaging Apparatus

Figure 2:
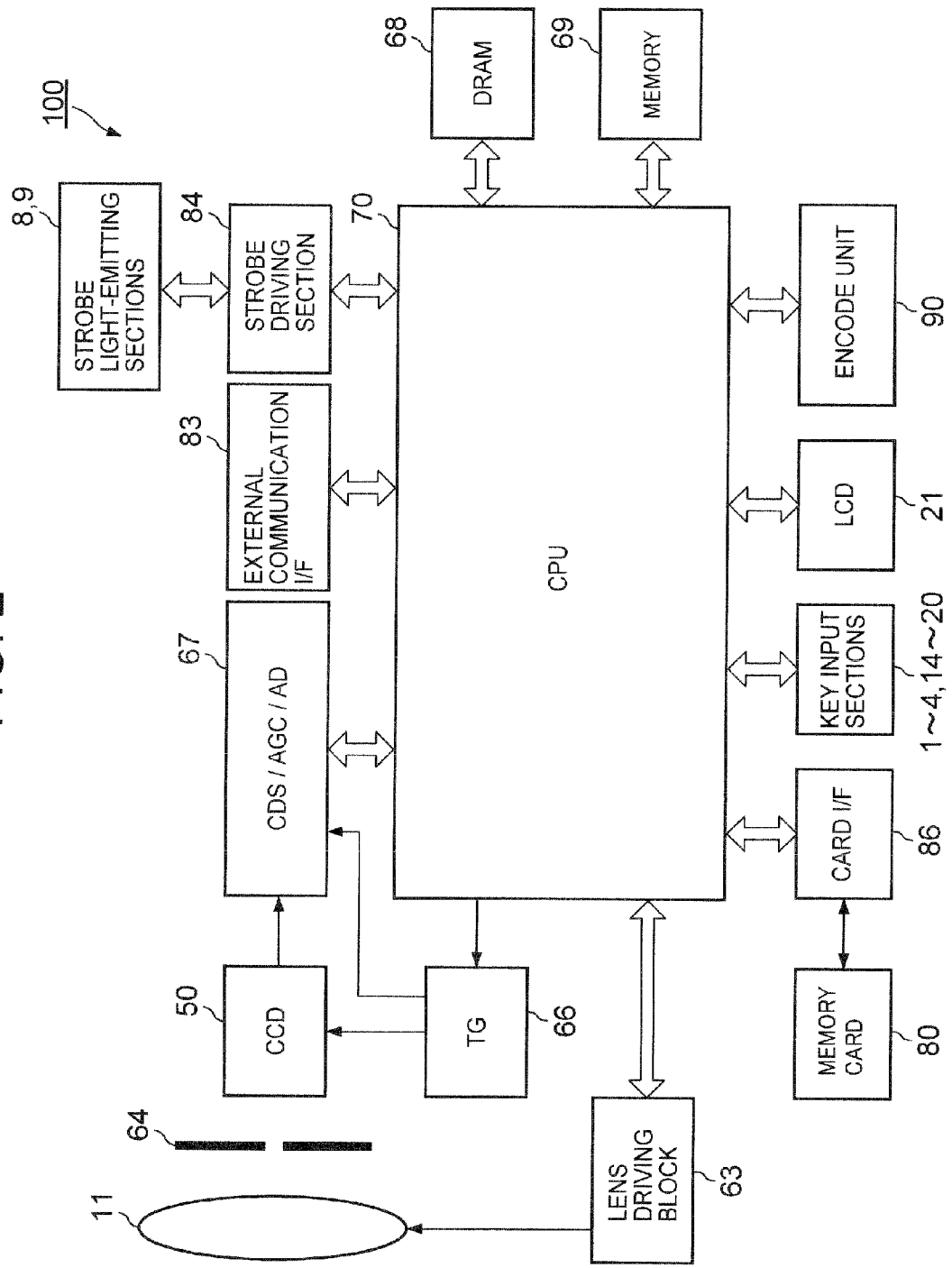
FIG. 2 is a function block diagram illustrating an embodiment of the imaging apparatus according to the present invention.

As shown in FIG. 2, the present embodiment of the imaging apparatus 100 includes: key input sections 1 to 4 and 14 to 20; strobe light-emitting sections 8 and 9; a lens 11; the LCD 21; a CCD 50; a lens driving block 63; an general aperture shutter 64; a Timing Generator (TG) 66; a unit circuit (CDS/AGC/AD) 67; a Dynamic Random Access Memory (DRAM) 68; a memory 69; a Central Processing Unit (CPU) 70; an external communication I/F (Interface) 83; a strobe driving section 84; a card interface (I/F) 86; and an the fps control section 90. The card I/F 86 is structured so that a memory card is detachably connected to a card slot of a body of the imaging apparatus 100 (not shown).

The key input sections 1 to 4 and 14 to 20 include a plurality of operation keys such as, for example, the mode dial 2, the continuous shooting dial 1, the power source button 3, the shutter button 4, the play button 14, the Rec button 15, the moving image button 16, the SET key 17, the control button 18, the MENU button 19, and the DISP key 20. The key input sections 1 to 4 and 14 to 20 output to the CPU 70 an operation signal in accordance with the key operation by the user.

The lens 11 includes a focus lens and a zoom lens. The lens 11 is connected to the lens driving block 63. This lens driving block 63 is composed of a focus motor and a zoom motor for driving the focus lens and the zoom lens (not shown) in an optical axis direction in parallel with an imaging area; and a focus driver and a zoom motor driver for driving, in accordance with a control signal from the CPU 70, the focus motor and the zoom motor, respectively.

The general aperture shutter 64 includes a driving circuit (not shown). This driving circuit causes the general aperture shutter to operate based on the control signal sent from the CPU 70. It is noted that this general aperture shutter 64 functions as an aperture and a shutter.

The term "aperture" herein is intended to mean a mechanism for controlling the amount of light entering through an imaging lens 62. The term "shutter" herein is intended to mean a mechanism for controlling the time during which light reaches the CCD 50. The time during which light reaches the CCD 50 (exposure time) changes depending on the speed at which the shutter is opened or closed (shutter speed). Thus, the amount of exposure can be determined based on the aperture and the shutter speed.

The CCD 50 converts the light projected from a subject via the imaging lens 62 and the general aperture shutter 64 to an electric signal to output the electric signal as the imaging signal to the unit circuit (CDS/AGC/AD) 67. The CCD 50 is driven based on a timing signal having a predetermined frequency generated by the TG 66. It is noted that the TG 66 is connected with the unit circuit (CDS/AGC/AD) 67.

The unit circuit (CDS/AGC/AD) 67 is composed of: a Correlated Double Sampling (CDS) circuit that subjects the imaging signal output from the CCD 50 to a correlated double sampling to retain the signal; an Automatic Gain Control (AGC) circuit that subjects the imaging signal thus sampled to an automatic gain adjustment; and an A/D converter that converts the imaging signal after the automatic gain adjustment from an analog format to a digital format. The imaging signal from the CCD 50 is sent as a digital signal to the CPU 70 via the unit circuit (CDS/AGC/AD) 67.

The CPU 70 has functions of image processing of the image data sent from the unit circuit 67 (e.g., a pixel interpolation processing, a gamma correction, generation of a luminance and chrominance signal, white balance processing, exposure correction processing), shake correction processing, compression and expansion of image data (e.g., JPEG-type compression and expansion). At the same time, the CPU 70 is a one-chip microcomputer which controls the respective parts of the imaging apparatus 100 according to a control program and includes a clock circuit for time keeping. The CPU 70 reads a program stored in the memory 69 and cooperates with this program to carry out various processes.

A DRAM 68 is used as a buffer memory for temporarily storing image data that was imaged by the CCD 50 and was subsequently sent to the CPU 70. The DRAM 68 is also used as a working memory of the CPU 70.

The external communication I/F 83 provides data input/output with an external electronic device (e.g., personal computer). The external communication I/F 83 provides the input/output through various interface standards such as, for example, USB standard, and IEEE 1394 standard and can be connected to an electronic device such as a personal computer through which data input/output can be achieved based on these standards. The external communication I/F 83 also may provide the input/output of image data with the external electronic device through infrared communication based on the IrDA standard or wireless communication based on the Bluetooth standard.

The strobe driving section 84 drives strobe light-emitting sections 8 and 9 based on the control signal from the CPU 70 to cause the strobe light-emitting sections 8 and 9 to emit a flash of light. The CPU 70 uses a photometric circuit (not shown) to determine whether a photographed scene is dark or not. When determining that the photographed scene is dark and a photograph is taken (when the shutter button 4 is depressed), the CPU 70 outputs the control signal to the strobe driving section 84.

The memory 69 stores therein the programs required for the control by the CPU 70 of the respective parts of the imaging apparatus 100 and data required for the control of the respective parts.

An encoding section 90 subjects to a compression coding a plurality of image data obtained by continuously driving the CCD 50.

Block Configuration for Control of Continuous Shooting Speed

Figure 3:
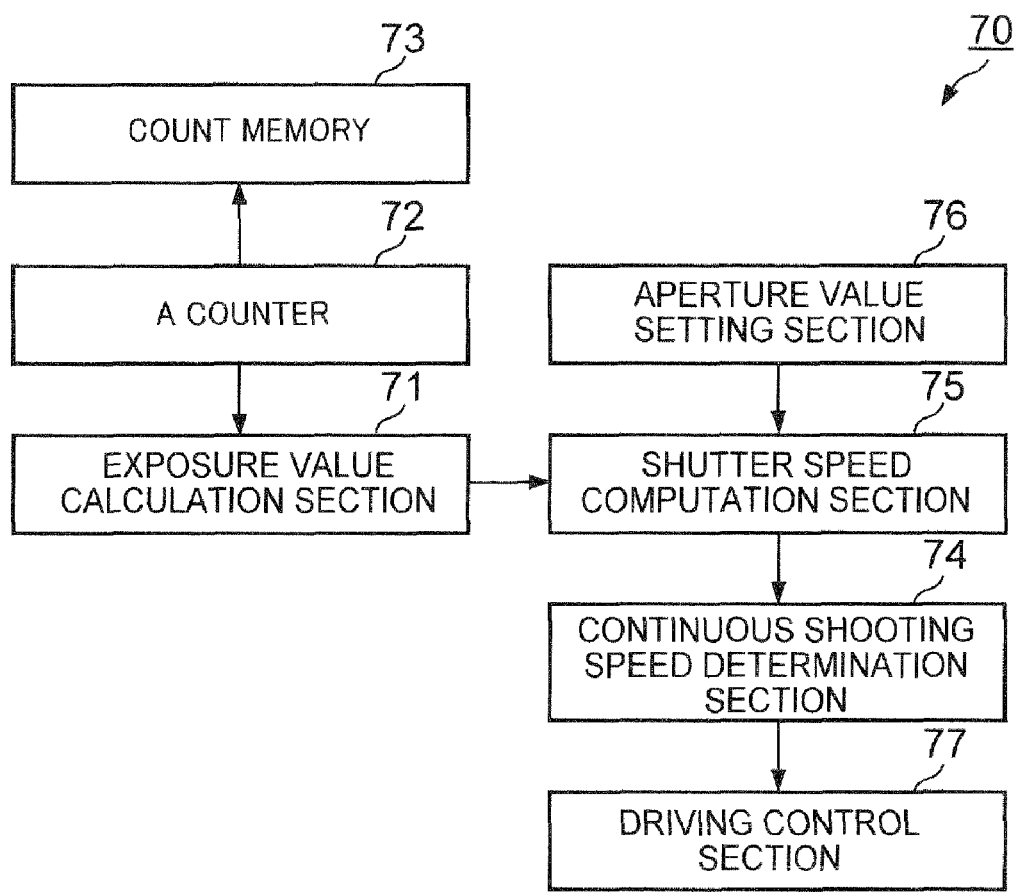
FIG. 3 is a function block diagram illustrating a control section according to the present invention and peripheral circuit sections thereof.

Specifically, as shown in FIG. 3, the CPU 70 includes therein: an exposure value calculation section 71; a counter 72; a count memory 73; a continuous shooting speed determination section 74; a shutter speed computation section 75; an aperture value setting section 76; a driving control section 77; and a shutter speed setting section 78.

The exposure value calculation section 71 calculates an exposure value based on the image data which is imaged. As a photometric method for exposure detection may be used, for example, multi-pattern photometry, center-weighted photometry, and/or spot photometry by an imaging element. As for the timing of the calculation, (1) the exposure value may be calculated when the half-depression of the shutter button 4 is detected; or (2) the exposure value may be calculated when the half-depression of the shutter button 4 is detected, and the exposure value may be further calculated and updated every predetermined number of photographed frames, from a photographed image; or (3) the exposure value may be calculated when the half-depression of the shutter button 4 is detected, and the exposure value may be further calculated and updated for each photographed frame, from a photographed image. These modes can be displayed on the LCD 21 as a sub menu and the user can select a mode from among these modes. In the above-described mode (3) for calculating the exposure value every predetermined shooting interval, the counter 72 and the count memory 73 generate the timing of the exposure value calculation.

The shutter speed computation section 75 carries out a well-known program AE control to compute a shutter speed by which an appropriate exposure is achieved in accordance with the exposure value calculated by the exposure value calculation section 71.

The program AE control method is a well-known control by which an aperture value and a shutter speed are automatically set so that an appropriate sensitivity can be obtained in accordance with an exposure value calculated based on the image data. The specific content of the program AE control is as follows. A program diagram is prepared in advance, which shows combinations of aperture values and shutter speeds providing an appropriate exposure, respectively corresponding to a plurality of exposure values. When photographing, the program diagram is used to determine a combination of an aperture value and a shutter speed providing an appropriate exposure by selecting a combination between an aperture value corresponding to an exposure value calculated based on the image data and a shutter speed. The above is the specific contents of the program AE control.

The shutter speed computation section 75 also carries out a well-known aperture-prioritized AE control to compute the shutter speed based on the exposure value calculated by the exposure value calculation section 71 and the aperture value set by the aperture value setting section 76 through the operation by the user.

The aperture-prioritized AE control is a well-known control to automatically set the shutter speed so that an appropriate sensitivity can be obtained in accordance with the aperture value set through the operation by the user and the exposure value calculated based on the image data. Specifically, the aperture-prioritized AE control determines in advance shutter speeds providing an appropriate exposure to correspond to a plurality of combinations of exposure values and aperture values. When photographing, a shutter speed is determined as a shutter speed providing an appropriate exposure by selecting, from among previously-determined shutter speeds, a shutter speed corresponding to a combination of an aperture value set by the operation by the user and an exposure value calculated based on image data. The above is the specific content of the aperture AE control.

It is noted that the memory 69 stores therein a program for the program AE control and a program for the aperture-prioritized AE control. The program AE control is carried out by allowing the CPU 70 to read the program for the program AE control from the memory 69 to operate in cooperation with this program. The program AE control is also carried out by allowing the CPU 70 to read the program for the aperture-prioritized AE control from the memory 69 to provide cooperation with this program.

The continuous shooting speed determination section 74 determines a continuous shooting speed based on the following formula (1). The continuous shooting speed indicates the number of times a photographing operation is carried out (i.e., the CCD 50 is driven to obtain one image data) per unit time.

Continuous shooting speed (fps)=1(second)/shutter speed (second)   (1)

In the above formula (1), the shutter speed is intended to mean a shutter speed computed by the shutter speed computation section 75. For example, when the shutter speed computed by the shutter speed computation section 75 is 1/60 (second), the continuous shooting speed determination section 74 determines that a continuous shooting speed is 60 (fps). The term "fps" used as a unit of the continuous shooting speed is a unit showing the number of image data (frames) that can be obtained in one second.

The shutter speed setting section 78 sets the shutter speed based on the operation signals in accordance with the operation by the user of the key input sections 1 to 4 and 14 to 20. The aperture value setting section 76 sets the aperture value based on the operation signals in accordance with the operation by the user of the key input sections 1 to 4 and 14 to 20. The driving control section 77 controls the TG 66 in accordance with the continuous shooting speed determined by the continuous shooting speed determination section 74. The encoding section 90 encodes a plurality of photographed image data by way of compression coding.

Details of Continuous Shooting Dial and Mode Dial

Figure 4A:
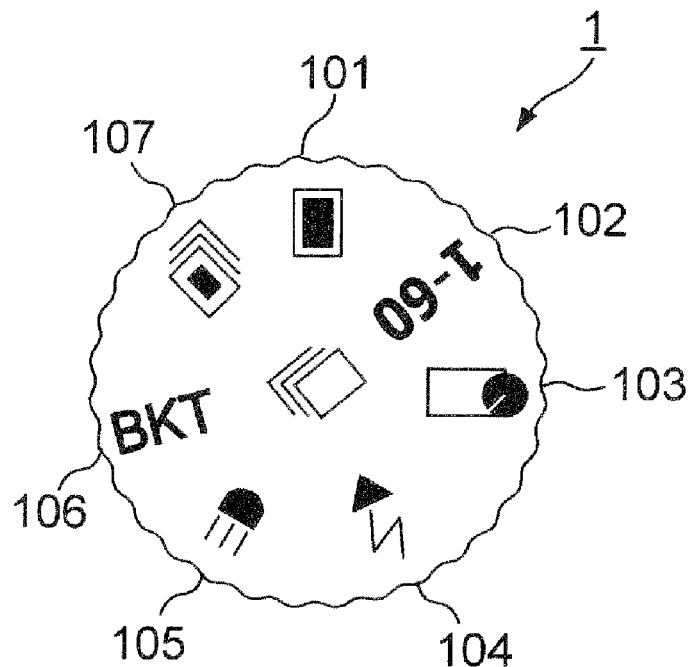
FIG. 4A is an external view showing a continuous shooting dial 1.

As shown in FIG. 4A, icons (indicators) showing various continuous shooting modes are printed on the continuous shooting dial 1. Specifically, a single shooting mode icon 101, an auto fps continuous shooting mode icon 102, a passed auto fps continuous shooting mode icon 103, a flash continuous shooting mode icon 104, an LED flash continuous shooting mode icon 105, a bracket continuous shooting mode icon 106, and a slow live view mode icon 107 are printed on the continuous shooting dial 1. When the continuous shooting dial 1 is rotated and when one of the icons corresponding to the mark A in FIG. 1A is detected, the corresponding continuous shooting mode is set.

In modes set through the detection of the rotation of the continuous shooting dial 1, the single shooting mode is a mode in which an image is imaged in response to the depression of the shutter button 4. The auto fps continuous shooting mode is a mode in which a continuous shooting speed providing an appropriate exposure is automatically determined in a range of continuous shooting speeds from 1 (fps) to 60 (fps) for example.

Figure 4B:
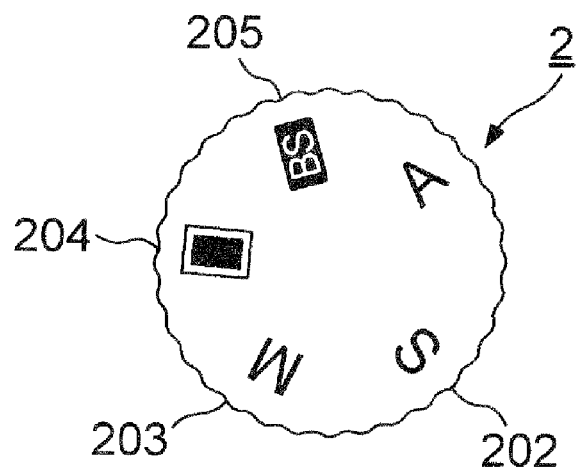
FIG. 4B is an external view showing a mode dial 2.

On the other hand, icons (indicators) showing various photographing modes are printed on the mode dial 2 as shown in FIG. 4B. Specifically, an aperture-prioritized AE mode icon 201, a shutter-speed-prioritized AE mode icon 202, a manual exposure mode icon 203, an auto still image photographing mode icon 204, and a photographing condition setting photographing mode icon 205 are printed on the mode dial 2. When the mode dial 2 is rotated and one of the icons corresponding to the mark A in FIG. 1(*a*) is detected, the corresponding photographing mode is set.

The term "aperture-prioritized AE mode" is a mode used by the user to set an aperture value. In this mode, the continuous shooting speed is automatically determined based on the aperture value set by the user and the detected exposure value.

The shutter-speed-prioritized AE mode is a mode used by the user to set a shutter speed. In this mode, the continuous shooting speed is automatically determined based on the shutter speed set by the user and the detected exposure value.

The manual exposure mode is a mode used by the user to freely set an aperture value and a shutter speed. In this mode, the continuous shooting speed is automatically determined based on the aperture value and the shutter speed set by the user, and a detected exposure value.

The auto still image photographing mode is a mode in which the continuous shooting speed is automatically determined based on a detected exposure value.

As described above, the continuous shooting dial 1 and the mode dial 2 are respectively rotated so that the respective icons are moved to the position of the mark A to set the continuous shooting mode and the photographing mode respectively corresponding to the icons at the position of the mark A.

Figure 5A:
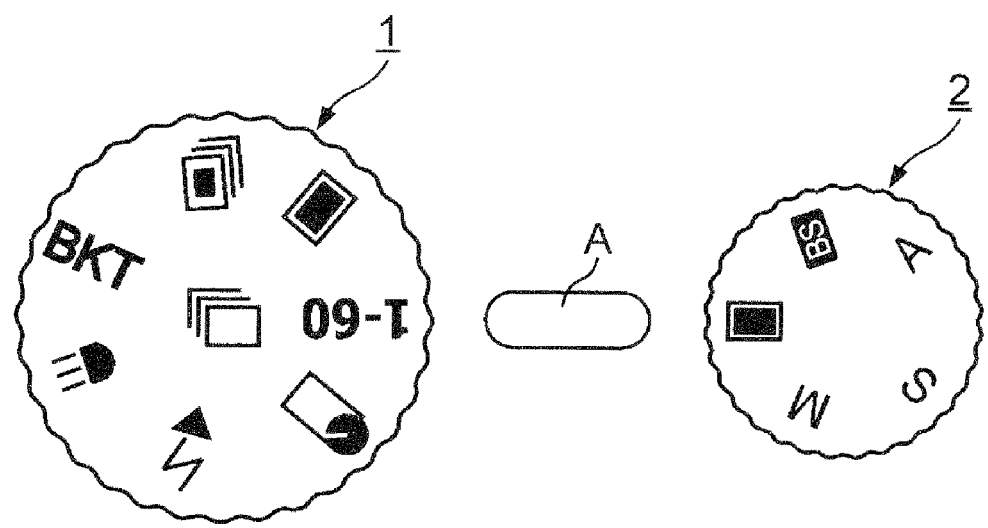
FIG. 5A is a view explaining how the continuous shooting dial 1 and the mode dial 2 are rotated when the "auto fps continuous shooting mode" is set and the "auto still image photographing mode" is set.

For example, a case is assumed as shown in FIG. 5A where the continuous shooting dial 1 is rotated so that the icon 102 showing "auto fps continuous shooting mode" corresponds to the position of the mark A and the mode dial 2 is rotated so that the icon 204 showing "auto still image photographing mode" corresponds to the position of the mark A. In this case, "auto fps continuous shooting mode" is set as the continuous shooting mode and "auto still image photographing mode" is set as the photographing mode. In this case, the continuous shooting speed is automatically determined based on the detected exposure value and the mode in which the continuous shooting is carried out is set.

Figure 5B:
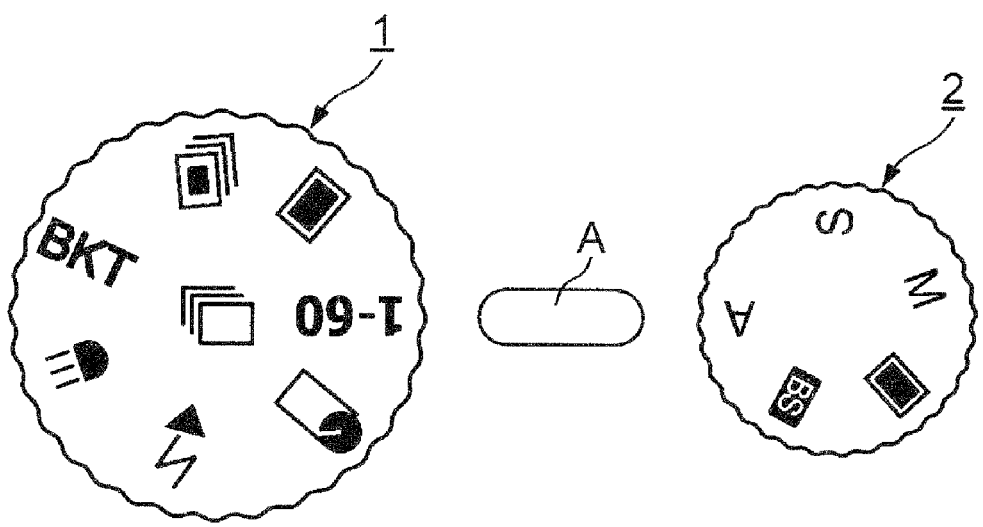
FIG. 5B is a view explaining how the continuous shooting dial 1 and the mode dial 2 are rotated when the "auto fps continuous shooting mode" is set and the "aperture-prioritized AE mode" is set.

A case is assumed as shown in FIG. 5B where the continuous shooting dial 1 is rotated so that the icon 102 showing the "auto fps continuous shooting mode" corresponds to the position of the mark A and the mode dial 2 is rotated so that the icon 201 showing the "aperture-prioritized AE mode" is rotated to correspond to the position of the mark A. In this case, the "auto fps continuous shooting mode" is set as the continuous shooting mode and the "aperture-prioritized AF mode" is set as the photographing mode. In this case, the continuous shooting speed is automatically determined based on the aperture value set through the operation by the user and the detected exposure value and the mode in which the continuous shooting is carried out is set.

EXAMPLE 1

With reference to FIG. 5 to FIG. 9, Example 1 of an operation processing of the present embodiment of the imaging apparatus 100 will be described in detail.

As shown in FIG. 5A, Example 1 is an operation processing performed by the imaging apparatus 100 when the "auto fps continuous shooting mode" is set through the operation by the user of the continuous shooting dial 1 and the "auto still image photographing mode" is set through the operation by the user of the mode dial 2.

Figure 7:
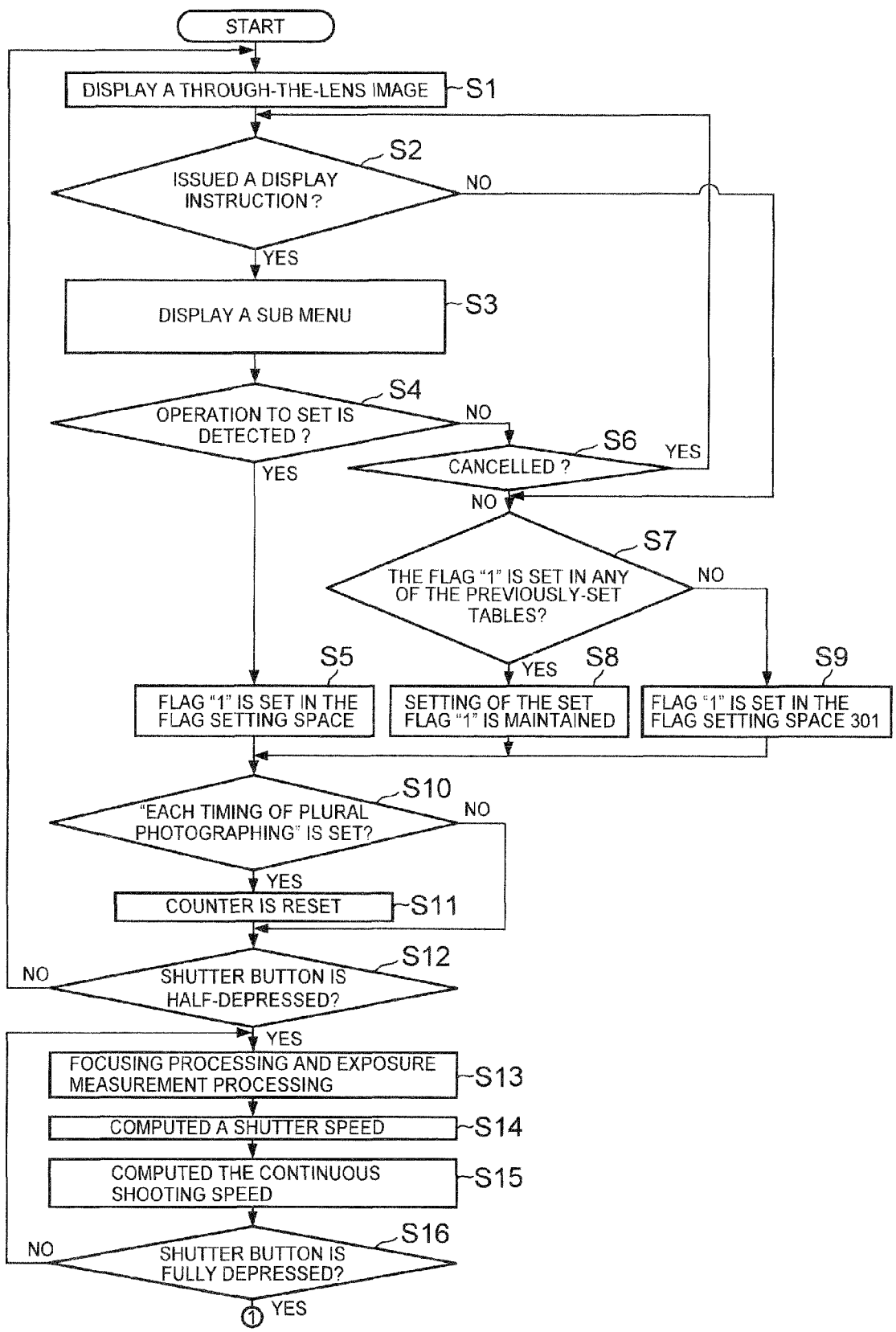
FIG. 7 is a flowchart illustrating a processing operation according to Example 1.
Figure 8:
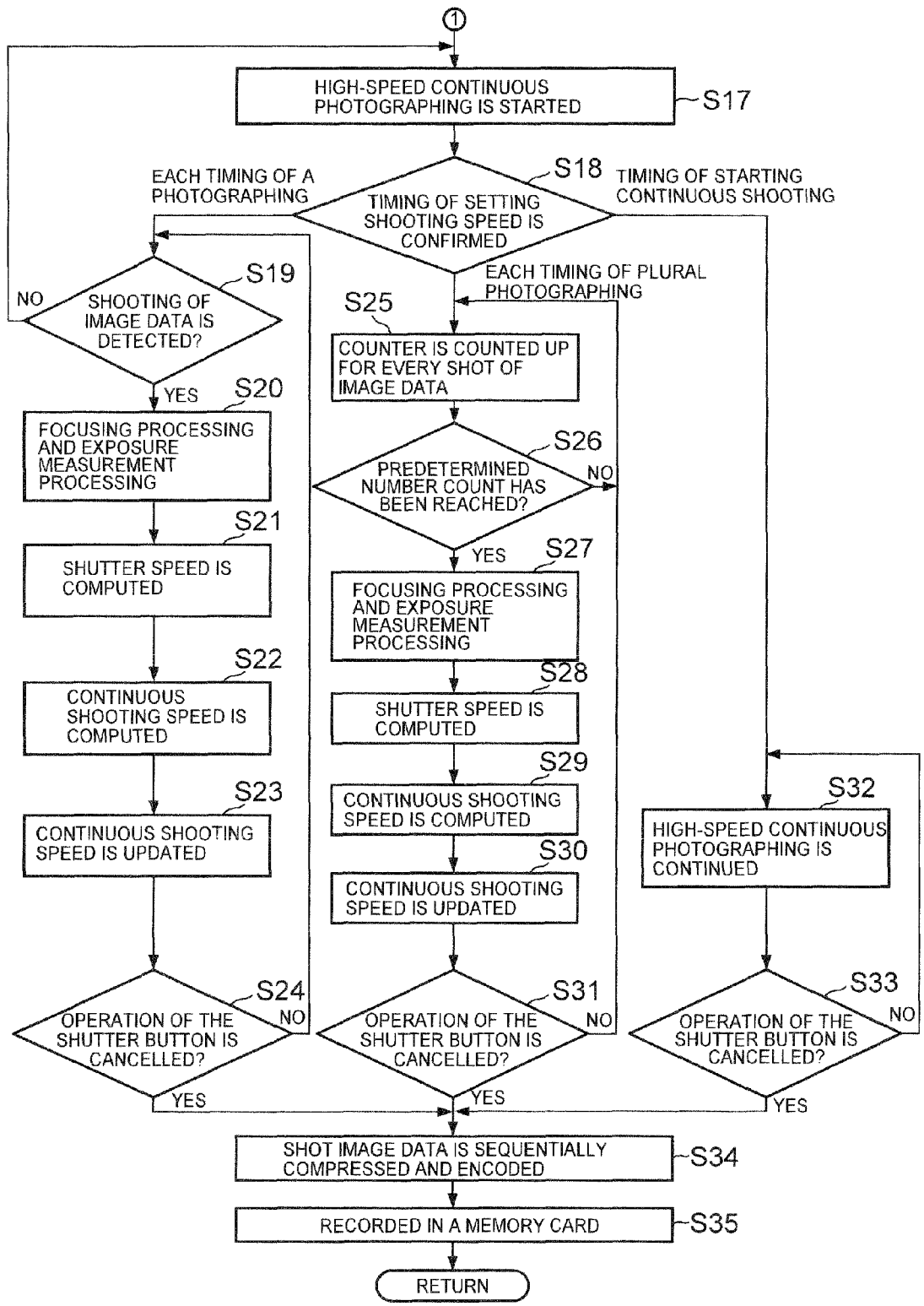
FIG. 8 is a flowchart illustrating a processing operation according to Example 1.

In this case, when the power source of the imaging apparatus 100 is turned on and when the operation of the Rec button 15 is detected, the CPU 70 reads from the memory 69 programs for carrying out processes in the flowcharts shown in FIG. 7 and FIG. 8. Various processes are carried out in cooperation with this program under the control of the CPU 70.

First, the CPU 70 outputs a signal to the TG 66 and drives the CCD 50 and the unit circuit 67 to carry out a sequential imaging to display the imaged image data as a through-the-lens image (step S1). Next, the CPU 70 detects whether or not the operation by the user has issued a display instruction to display on the LCD 21 a menu of the timing of setting continuous speed as a sub menu (step S2). When the display instruction is issued ("YES" in step S2), the CPU 70 causes the menu of the timing of setting continuous speed to be displayed on a part of the LCD 21 to indicate 1) timing of starting continuous shooting, 2) each timing of a photographing, and 3) each timing of plural photographing (step S3). When the display instruction is not detected ("NO" in step S2) on the other hand, the processing proceeds to step S7.

When the menu of the timing of setting continuous speed is displayed on the LCD 21 as a sub menu, the CPU 70 is in a stand-by state to detect an operation to set the timing of setting shooting speed (step S4).

The timing of setting shooting speed is the timing when the continuous shooting speed is set or updated in a high-speed continuous shooting.

The three timings for which are "timing of starting continuous shooting" and "each timing of a photographing" and "each timing of plural photographing" are prepared as the timing of setting shooting speed.

The timing of setting shooting speed is set using a table 300 shown in FIG. 6. The table 300 is stored in the memory 69. The table 300 includes: a flag space 301 corresponding to "timing of starting continuous shooting", a flag space 302 corresponding to "each timing of a photographing", and a flag space 303 corresponding to "each timing of plural photographing". One of the three timings is set through the operation by the user.

In accordance with the operation by the user in the menu of the timing of setting continuous speed, a flag of "1" is set in any one of flag spaces 301, 302, and 303 to set one of the above three timings. In the remaining two flag setting spaces in which the flag "1" is not set, a flag "0" is automatically set. For example, in the example of the setting state of the timing of setting shooting speed shown in FIG. 6, the flag "1" is set in the flag setting space corresponding to "timing of starting continuous shooting". The flag "0" is set in each of the flag setting spaces corresponding to "each timing of a photographing" and "each timing of plural photographing". Thus, in the example of FIG. 6, "timing of starting continuous shooting" is set as the timing of setting shooting speed.

When "timing of starting continuous shooting" is set as the timing of setting shooting speed, the continuous shooting speed is set only immediately after the execution of a focusing processing.

When "each timing of a photographing" is set as the timing of setting shooting speed, the continuous shooting speed is updated whenever the COD 50 is driven to provide one image data.

When "each timing of plural photographing" is set as the timing of setting shooting speed, the continuous shooting speed is updated whenever the CCD 50 is driven to provide a predetermined number of pieces of image data (e.g., 10 image data).

The operation processing to be carried out when these three timings are set will be described in detail later.

When the operation by the user to set the timing of setting shooting speed is detected ("YES" in step S4), the flag "1" is set in the flag setting space in accordance with the setting operation by the user (step S5). For example, when the user sets "timing of starting continuous shooting" in the menu of the timing of setting continuous speed, the flag "1" is set in the flag space 301 corresponding to "timing of starting continuous shooting". Mien the operation by the user to set the timing of setting shooting speed is not detected on the other hand ("NO" in step S4), whether or not the display instruction in the sub menu is cancelled is detected (step S6). When the display cancel instruction is detected, the processing returns to step S2. When the display cancel instruction is not detected, whether or not the flag "1" is set in any of the previously-set exposure measurement setting tables is detected (step S7).

When the detection operation in step S7 finds that the flag "1" is set in any of the previously-set exposure measurement setting tables ("YES" in step S7), the setting of the set flag "1" is maintained (step S8). When the detection operation in step S7 finds that no flag "1" is set in any of the previously-set exposure measurement setting tables ("NO" in step S7), the flag "1" is set to "timing of starting continuous shooting" as a default setting (step S9).

Next, whether or not "each timing of plural photographing" is set is confirmed (step S10). When "each timing of plural photographing" is set ("YES" in step S10), the counter 72 is reset (step S11). When "each timing of plural photographing" is not set on the other hand ("NO" in step S10), the processing proceeds to step S12.

Next, whether or not the shutter button 4 is half-depressed is detected (step S12). When the half-depression of the shutter button 4 is detected, the focusing processing and the exposure measurement processing by an exposure value calculation section 71 are carried out (step S13). When the half-depression of the shutter button 4 is not detected on the other hand, the processing returns to step S1.

When the focusing processing based on the control signal from the CPU 70 and the exposure measurement processing by the exposure value calculation section 71 are carried out in step S13, the shutter speed computation section 75 computes a shutter speed by means of the program AE control in accordance with the exposure value measured by the exposure value calculation section 71 and outputs the result (step S14). Then, the continuous shooting speed determination section 74 computes the continuous shooting speed in accordance with the shutter speed output from the shutter speed computation section 75 following the above formula (1) and outputs the result (step S15).

Next, whether or not the shutter button 4 is fully depressed is detected (step S16). When the full depression of the shutter button 4 is detected ("YES" in step S16), the driving control section 77 controls the TG 66 so that the continuous shooting speed output from the continuous shooting speed determination section 74 is achieved and drives the CCD 50 to start the high-speed continuous photographing (shooting) (step S17). When the full depression of the shutter button 4 is not detected on the other hand ("NO" in step S16), the processing returns to step S13.

Next, whether or not the flag "1" is set in any of the flag spaces 301, 302, and 303 in the table 300 is checked to confirm the set timing of setting shooting speed (step S18). When it is confirmed that the flag "1" is set in the flag space 302, it is judged that "each timing of a photographing" is set as the timing of setting shooting speed and the processing proceeds to step S19.

Next, whether or not the shooting of image data is detected is judged (step S39). When the shooting of image data is not detected ("NO" in step S19), the processing returns to step S17. When the shooting of image data is detected ("YES" in step S19), the focusing processing and the exposure measurement processing are carried out (step S20). Then, the shutter speed computation section 75 computes a shutter speed in accordance with the exposure value measured by the exposure value calculation section 71 by means of the above program AE control, and output it(step S21). Next, the continuous shooting speed determination section 74 computes the continuous shooting speed in accordance with the shutter speed output from the shutter speed computation section 75 following the above formula (1) and outputs it (step S22). Next, the continuous shooting speed is updated from the continuous shooting speed output in step S15 to the continuous shooting speed output in step S22 and the high-speed continuous photographing is continued (step S23).

Next, whether or not the operation of the shutter button 4 is cancelled is detected (step S24). When the operation of the shutter button 4 is cancelled ("YES" in step S24), the processing proceeds to step S34. When the operation of the shutter button 4 is not cancelled ("NO" in step S24), the processing returns to step S19.

When it is confirmed in step S18 that the flag "1" is set in the flag space 303, it is judged that "each tiring of plural photographing" is set as the timing of setting shooting speed and the processing proceeds to step S25.

Next, the counter 72 is counted up for every shot of image data (step S25) to determine whether or not a predetermined number count has been reached (step S26). When the count has not reached the predetermined number ("NO" in step S26), the processing returns to step S25. When the count has reached the predetermined number ("YES" in step S26), the focusing processing and the exposure measurement processing are carried out (step S27). Then, the shutter speed computation section 75 computes the shutter speed in accordance with the exposure value measured by the exposure value calculation section 71 by means of the above program AE control and outputs it (step S28). Next, the continuous shooting speed determination section 74 computes the continuous shooting speed in accordance with the shutter speed output from the shutter speed computation section 75 following the above formula (1) and outputs it (step S29). Next, the continuous shooting speed is updated from the continuous shooting speed output in step S15 to the continuous shooting speed output in step S29 and the high-speed continuous photographing is continued (step S30).

Next, whether or not the operation of the shutter button 4 is cancelled is detected (step S31). When the operation of the shutter button 4 has been cancelled ("YES" in step S31), the processing proceeds to step S34. When the operation of the shutter button 4 has not been cancelled ("NO" in step S31), the processing returns to step S25.

When it is confirmed in step S18 that the flag "1" is set in the flag space 301, it is judged that "timing of starting continuous shooting" is set as the timing of setting shooting speed and the processing proceeds to step S32.

Next, the high-speed continuous photographing is continued with the continuous shooting speed output in step S15 (step S32) and whether or not the operation of the shutter button 4 has been is cancelled is detected (step S33). When the operation of the shutter button 4 has been cancelled ("YES" in step S33), the processing proceeds to step S34. When the operation of the shutter button 4 has not been cancelled ("NO" in step S33), the processing returns to step S32. In step S34, the shot image data is sequentially compressed and encoded, and this compressed and encoded image data is temporarily stored in the DRAM 68 and recorded in a memory card 80 (step S35).

EXAMPLE 2

Figure 10:
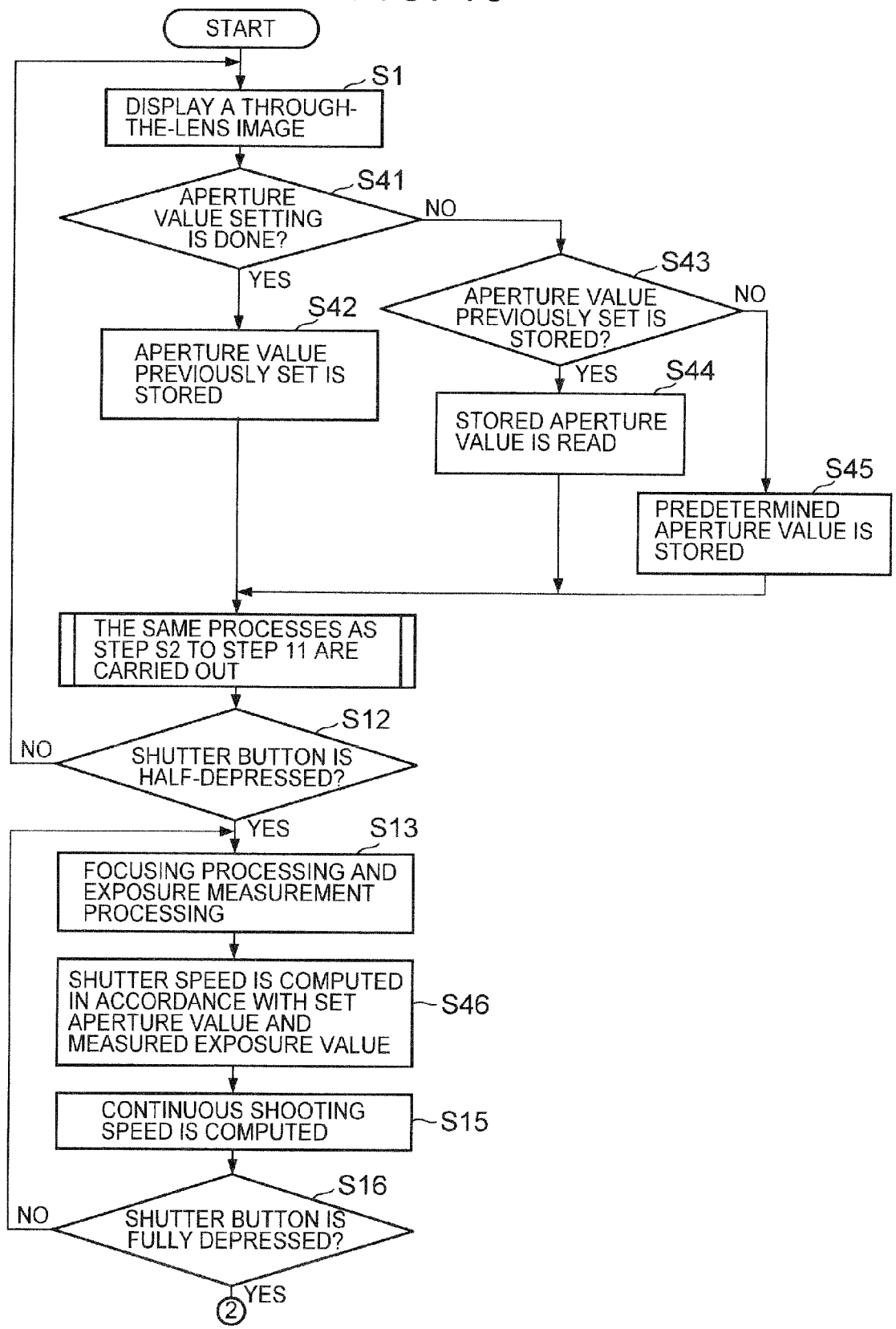
FIG. 10 is a flowchart illustrating a processing operation according to Example 2.

With reference to FIG. 5 and FIG. 10, FIG. 11, Example 2 of the operation processing of the present embodiment of the imaging apparatus 100 will be described in detail.

As shown in FIG. 5(*b*), Example 2 is an operation processing performed by the imaging apparatus 100 when "auto fps continuous shooting mode" is set through the operation by the user of the continuous shooting dial 1 and the "aperture-prioritized AE mode" is set through the operation by the user of the mode dial 2.

In this case, when the power source of the imaging apparatus 100 is turned on and the operation of the Rec button 15 is detected, the CPU 70 reads from the memory 69 a program to carry out the processes in the flowcharts shown in FIG. 10 and FIG. 11. Various processes are carried out in cooperation with this program under the control of the CPU 70.

First, the CPU 70 outputs a signal to the TG 66 and drives the CCD 50 and the unit circuit 67 to carry out the sequential imaging to display the imaged data as a through-the-lens image (step S1). Next, the CPU 70 detects whether or not the operation by the user of the aperture value setting is done (step S41). When the aperture value setting operation through the operation by the user of the key input sections 1 to 4 and 14 to 20 is done ("YES" in step S41), the set aperture value is stored in the DRAM 68 (step S42) and the same processes as step S2 to step S11 shown in FIG. 8 are carried out.

When the aperture value setting operation through the operation by the user of the key input sections 1 to 4 and 14 to 20 is not detected ("NO" in step S41) on the other hand, whether or not the aperture value previously set by the user is stored in the DRAM 68 is detected (step S43). When the aperture value previously set by the user is stored in the DRAM 68 ("YES" in step S43), the stored aperture value is read from the DRAM 68 (step S44) and the same processes as step S2 to step S11 shown in FIG. 8 are carried out. When the aperture value previously set by the user is not stored in the DRAM 68 ("NO" in step S43) on the other hand, a predetermined aperture value is stored in the DRAM 68 (step S45) and the same processes as step S2 to step S1 shown in FIG. 8 are carried out.

Next, whether or not the shutter button 4 is half-depressed is detected (step S12). When it is judged that the shutter button 4 is not half-depressed ("NO" in step S12), the processing returns to step S1. When it is judged that the shutter button 4 is half-depressed ("YES" in step S12), the focusing processing based on the control signal from the CPU 70 and the exposure measurement processing by the exposure value calculation section 71 are carried out (step S13). Next, the shutter speed computation section 75 computes the shutter speed in accordance with the aperture value determined by aperture value determination section 76 and the exposure value measured by the exposure value calculation section 71 by mean of the above aperture-prioritized AE and output it (step S46). Next, the continuous shooting speed determination section 74 computes the continuous shooting speed in accordance with the shutter speed output from the shutter speed computation section 75 following the above formula (1) and output it (step S15).

Next, whether or not the shutter button 4 is fully-depressed is detected (step S16). When the full depression of the shutter button 4 is detected ("YES" in step S16), the driving control section 77 controls the TG 66 so that the continuous shooting speed output from the continuous shooting speed determination section 74 is achieved and starts the high-speed continuous photographing (shooting) (step S17). When the full depression of the shutter button 4 is not detected ("NO" in step S16) on the other hand, the processing returns to step S13.

Next, whether or not the flag "1" is set in any of the flag spaces 301, 302, and 303 in the table 300 is determined to confirm the set timing of setting shooting speed (step S18). When it is confirmed that the flag "1" is set in the flag space 302, it is judged that "each timing of a photographing" is set as the timing of setting shooting speed and the processing proceeds to step S19.

Next, whether or not the shooting of image data is detected is judged (step S19). When the shooting of image data is not detected ("NO" in step S19), the processing returns to step S17. When the shooting of image data is detected ("YES" in step S19), the focusing processing and the exposure measurement processing are carried out (step S20). Then, the shutter speed computation section 75 computes the shutter speed in accordance with the aperture value determined by the aperture value determination section 76 and the exposure value measured by the exposure value calculation section 71 by means of the above aperture-prioritized AE control and outputs it (step S47). Next, the continuous shooting speed determination section 74 computes an optimal continuous shooting speed in accordance with the shutter speed output from the shutter speed computation section 75 by means of the above formula (1), and outputs it (step S48). Next, the continuous shooting speed output in step S15 is updated to the continuous shooting speed output in step S48 and the high-speed continuous photographing is continued (step S23).

Whether or not the operation of the shutter button 4 has been cancelled is detected (step S24). When the operation of the shutter button 4 has been cancelled ("YES" in step S24), the processing proceeds to step S34. When the operation of the shutter button 4 has not been cancelled ("NO" in step S24), the processing returns to step S19.

When it is confirmed in step S18 that the flag "1" is set in the flag space 303, it is judged that "each timing of plural photographing" is set as the timing of setting shooting speed and the processing proceeds to step S25.

Next, the counter 72 is counted up at each shot of image data (step S25) to determine whether or not a predetermined count has been reached (step S26). When the count has not reached the predetermined number ("NO" in step S26), the processing returns to step S25. When the count has reached the predetermined number ("YES" in step S26), the focusing processing and the exposure measurement processing are carried out (step S27). Then, the shutter speed computation section 75 computes the shutter speed in accordance with the aperture value determined by the aperture value determination section 76 and the exposure value measured by the exposure value calculation section 71 by means of the above aperture-prioritized AE control and outputs it (step S28). Next, the continuous shooting speed determination section 74 computes an optimal continuous shooting speed in accordance with the shutter speed output from the shutter speed computation section 75 and outputs it (step S29). Next, the continuous shooting speed is updated from the continuous shooting speed output in step S15 to the continuous shooting speed output in step S50 and the high-speed continuous photographing is continued (step S30).

Whether or not the operation of the shutter button 4 has been cancelled is detected (step S31). When the operation of the shutter button 4 has been cancelled ("YES" in step S31), the processing proceeds to step S34. When the operation of the shutter button 4 has not been cancelled ("NO" in step S31), the processing returns to step S25.

When it is confirmed in step S18 that the flag "1" is set in the flag space 301, it is judged that "timing of starting continuous shooting" is set as the timing of setting shooting speed and the processing proceeds to step S25.

Next, the high-speed continuous photographing is continued with the continuous shooting speed output in step S15 (step S32). Whether or not the operation of the shutter button 4 has been cancelled is detected (step S33). When the operation of the shutter button 4 has been cancelled ("YES" in step S33), the processing proceeds to step S34. When the operation of the shutter button 4 has not been cancelled ("NO" in step S33), the processing returns to step S32. In step S34, the shot image data is sequentially compressed and encoded, and this compressed and encoded image data is stored in the DRPM 68 and recorded in the memory card 80 (step S35).

As described above, in Example 1, the shutter speed providing an appropriate exposure is computed by means of the program AE control. Thus, image data providing an appropriate exposure can be obtained in every photographing operation in the continuous shooting.

In Example 2, the shutter speed providing an appropriate exposure is computed in accordance with the aperture value set through the operation by the user and the exposure value calculated based on the image data by means of the aperture-prioritized AE control. By doing this, the shutter speed reflecting the aperture value set through the operation by the user can be computed.

Furthermore, since the shutter speed providing an appropriate exposure is computed by means of the aperture-prioritized AE control, the image data providing an appropriate exposure can be obtained in every photographing operation in the continuous shooting.

In the present embodiment, the shutter speed providing an appropriate exposure is computed by means of the program AE control or the aperture-prioritized control, and the continuous shooting speed following the above formula (1) is automatically determined in accordance with this computed shutter speed. As a result, the user does not have to manually set the continuous shooting speed and thus can easily set the continuous shooting speed providing an appropriate exposure.

In the present embodiment, the continuous shooting speed determined by the above formula (1) is a value obtained by dividing a unit time by the shutter speed computed by the program AE control or the aperture-prioritized control. Thus, the continuous shooting speed providing the maximum number of photographing operations per unit time (i.e., the highest continuous shooting speed) can be automatically determined from among the continuous shooting speeds that can be realized by the shutter speed providing an appropriate exposure (the computed shutter speed). As a result, the appropriate exposure can be secured and high-speed continuous shooting can be realized at the same time.

In the present embodiment, when "each timing of a photographing" is set as the timing of setting shooting speed, the exposure value is measured and the shutter speed is calculated whenever one image data is obtained during continuous shooting. As a result, even when the photographing apparatus 100 is moved from a bright place to a dark place in the middle of continuous shooting for example, the shutter speed can be changed depending on a change in the exposure value that can be measured at the location where the photographing is carried out. As a result, even when the photographing apparatus 100 is moved from a bright place to a dark place in the middle of continuous shooting for example, all image data obtained by this continuous shooting has appropriate exposure.

In the present embodiment, when "measurement with each timing of plural photographing" is set as the timing of setting shooting speed, whenever a predetermined number of image data is obtained by the continuous shooting, the exposure value is measured, the shutter speed is calculated, and the continuous shooting speed is updated. As a result, even when the photographing apparatus 100 is moved from a bright place to a dark place in the middle of continuous shooting for example, the continuous shooting speed can be changed depending on a change in the exposure value that can be measured in the place where the photographing is carried out. As a result, even when the photographing apparatus 100 is moved from a bright place to a dark place in the middle of the continuous shooting, all image data obtained by this continuous shooting has appropriate exposure.

In the present embodiment, when "timing of starting continuous shooting" is set as the timing of setting shooting speed, the continuous shooting speed is automatically set based on the exposure value measured when the shutter button is half-depressed. Thus, the continuous shooting providing an appropriate exposure can be easily carried out in a photographing operation.

In the present embodiment, the user can rotate the continuous shooting dial 1 and the mode dial 2 respectively to easily set various continuous shooting modes.

Figure 9:
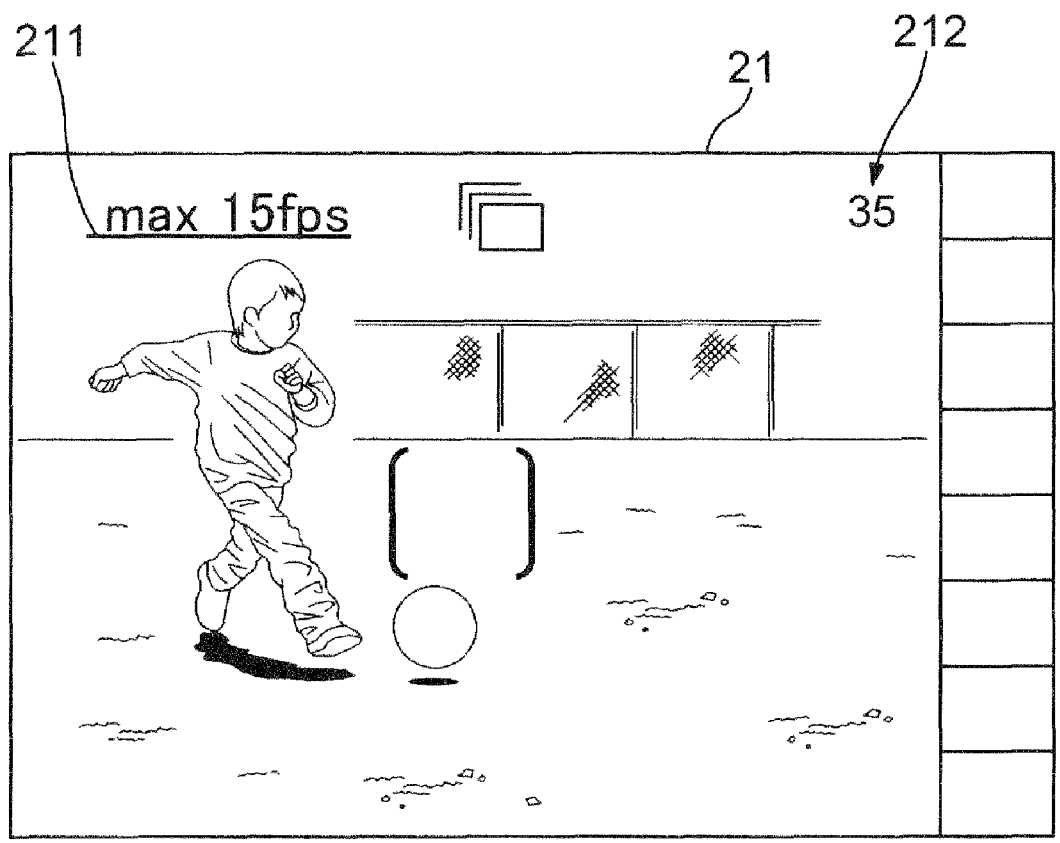
FIG. 9 is a view showing an example of the displays of the continuous shooting speed and the like according to an embodiment of the present invention.

In the present embodiment, as shown in FIG. 9, the LCD 21 also may display, together with the through-the-lens image, the information for the continuous shooting speed 211 determined by the continuous shooting speed determination section 74 ("15 fps" in the example of FIG. 9). In this case, the display of the information for the continuous shooting speed 211 may be updated whenever the continuous shooting speed is updated in steps S23 and S30. Furthermore, the LCD 21 also may display the information showing the number of images 212 obtained by a single continuous shooting ("35" in the example of FIG. 9). As a result, the user can easily understand the maximum continuous shooting speed and the number of images to be obtained during the continuous shooting.

The present invention also can be applied to an imaging apparatus that does not have a high-speed continuous shooting function (e.g., a photographing function for carrying out a few dozen photographing operations in one second) and that merely has a normal continuous shooting function (e.g., a photographing function for carrying out a few photographing operations in one second). The present invention is not limited to the above embodiments and various modifications also can be made within a scope without departing from the spirit of the invention.

What is claimed is:

1. An imaging apparatus, comprising:
a continuous shooting mode setting section which sets a continuous shooting mode of automatically updating a continuous shooting speed during a continuous shooting of still images;
an imaging section which photographs a subject image to obtain image data;
a calculation section which calculates an exposure value based on the image data obtained by the imaging section during the continuous shooting in the continuous shooting mode set by the continuous shooting mode setting section;
a computation section which computes a new exposure time providing an appropriate exposure in accordance with the exposure value calculated by the calculation section whenever the exposure value is calculated by the calculation section;
a determination section which determines, in accordance with the exposure time computed by the computation section, a new continuous shooting speed providing a maximum number of photographs per unit time whenever the exposure time is calculated by the computation section; and
a driving control section which drives the imaging section so that a photographing operation is continuously carried out in accordance with the new continuous shooting speed determined by the determination section whenever the new continuous shooting speed is determined by the determination section.

2. The imaging apparatus according to claim 1, wherein:
the imaging apparatus includes a setting section for setting an aperture value, and
the computation section computes an exposure time providing an appropriate exposure in accordance with the exposure value calculated by the calculation section and the aperture value set by the setting section.

3. The imaging apparatus according to claim 1, wherein the calculation section calculates a new exposure value whenever a predetermined number of image data is obtained by the imaging section.

4. The imaging apparatus according to claim 3, wherein whenever a new image data is obtained by the imaging section, the calculation section calculates a new exposure value based on the obtained new image data.

5. The imaging apparatus according to claim 1, wherein:
the imaging apparatus includes a detector which detects a focus instruction for focusing, and the calculation section calculates the exposure value when the focus instruction is detected by the detector.

6. The imaging apparatus according to claim 1, further comprising a display section which displays the continuous shooting speed determined by the determination section.

7. A continuous shooting control method, comprising:
setting a continuous shooting mode of automatically updating a continuous shooting speed during a continuous shooting of still images;
calculating an exposure value based on image data obtained through a photographing operation during the continuous shooting in the continuous shooting mode;
computing a new exposure time by a program AE control in accordance with the calculated exposure value whenever the exposure value is calculated;
determining, in accordance with the computed exposure time, a new continuous shooting speed providing a maximum number of photographs per unit time whenever the exposure time is calculated; and
driving an imaging section so that the photographing operation is continuously carried out with the determined continuous shooting speed whenever the new continuous shooting speed is determined.

8. A non-transitory computer-readable recording medium having a program stored thereon which controls a computer provided in an imaging apparatus to perform functions comprising:
a continuous shooting mode setting processing that sets a continuous shooting mode of automatically updating a continuous shooting speed during a continuous shooting of still images;
a calculation processing which calculates an exposure value based on image data obtained through a photographing operation during the continuous shooting in the continuous shooting mode;
a computation processing which computes a new exposure time by a program AE control in accordance with the calculated exposure value whenever the exposure value is calculated;
a determination processing which determines, in accordance with the computed exposure time, a new continuous shooting speed, providing a maximum number of photographs per unit time whenever the exposure time is calculated; and
a driving control processing which drives an imaging section so that a photographing operation is continuously carried out with the determined continuous shooting speed whenever the new continuous shooting speed is determined.

* * * * *